United States Patent [19]

Hayashi et al.

[11] 4,212,960
[45] Jul. 15, 1980

[54] EPOXY RESIN COMPOSITION

[75] Inventors: Osamu Hayashi; Kazuo Okahashi; Hiroshi Ono, all of Amagasaki, Japan

[73] Assignee: Mitsubishi Denki Kabushiki Kaisha, Tokyo, Japan

[21] Appl. No.: 914,947

[22] Filed: Jun. 12, 1978

[30] Foreign Application Priority Data

Nov. 5, 1977 [JP] Japan .................................. 52-132904

[51] Int. Cl.$^2$ ............................................. C08L 63/00
[52] U.S. Cl. ...................................... 525/524; 525/930; 260/18 EP
[58] Field of Search ....... 260/830 R, 830 TW, 18 EP; 525/524, 930

[56] References Cited

U.S. PATENT DOCUMENTS

| | | | |
|---|---|---|---|
| 3,177,089 | 4/1965 | Marshall | 260/830 R |
| 3,177,090 | 4/1965 | Bayes | 260/830 R |
| 3,336,257 | 8/1967 | Alvey | 260/47 |
| 3,352,809 | 11/1967 | Carlyle | 260/30.4 |
| 3,395,118 | 7/1968 | Reinking | 260/47 |
| 3,424,707 | 1/1969 | Schaufelberger | 260/32.8 |
| 3,873,637 | 3/1975 | Fujiwara | 260/830 TW |

*Primary Examiner*—Paul Lieberman
*Attorney, Agent, or Firm*—Oblon, Fisher, Spivak, McClelland & Maier

[57] ABSTRACT

An epoxy resin composition for flexible products having excellent electrical and mechanical characteristics and having long pot-life is provided by incorporating (A) a liquid epoxy compound having 2 or more epoxy groups in one molecule, (B) an acid anhydride type hardener and (C) a reaction product obtained by reacting a phenoxy resin or a high molecular weight epoxy resin with a monohydric alcohol glycidyl ether and a metal salt of carboxylic acid.

10 Claims, No Drawings

EPOXY RESIN COMPOSITION

BACKGROUND OF THE INVENTION

The expoxy resins have excellent adhesiveness as well-known and have been used for bonding a metal, a glass or a wooden product or a coating on the surfaces thereof. The epoxy resins have excellent heat stability, mechanical characteristics and electric insulation as well as excellent adhesiveness, bending property and chemical resistance whereby the epoxy resins have been used in various fields such as casted products, glass fiber laminated products and electric insulating products.

However, in general, the epoxy resins have relatively low flexibility whereby cracks may be easily formed in manufactures of large size impregnated products and large size casted products having complicated shapes and have brittle coated film in applications of non-solvent type varnishes, disadvantageously.

In order to improve the brittleness of the epoxy resin and to impart flexible characteristics, it has been known to blend a polyamide resin, an epoxide vegetable oil or plasticized epoxy resin.

However, when these materials are incorporated in the epoxy resin, the mechanical and electrical characteristics are remarkably deteriorated and the usages of the resulting products are disadvantageously limited.

It has been known that typical epoxy resin compositions for impregnation can be prepared by incorporating a hardener such as acid anhydride, e.g. methyl tetrahydrophthalic acid anhydride, a hardening accelerator such as tertiary amines, imidazoles, metal chelating compounds to a bis-phenol type epoxy resin.

These epoxy resin compositions have disadvantages of relatively short life and undesirable viscosity for processing.

It has been needed to obtain epoxy resin compositions which have superior characteristics for processing and long pot-life and form hardened products having excellent electrical and mechanical characteristics such as insulation.

SUMMARY OF THE INVENTION

It is an object of the present invention to provide epoxy resin compositions which have long pot-life and suitable viscosity for processing and which form hardened products having excellent electrical and mechanical characteristics.

The foregoing and other objects of the present invention have been attained by providing an epoxy resin composition for flexible products which comprises (A) a liquid epoxy compound having 2 or more epoxy groups in one molecule, (B) an acid anhydride type hardener and (C) a reaction product obtained by reacting a phenoxy resin or a high molecular weight epoxy resin with a monohydric alcohol glycidyl ether and a metal salt of carboxylic acid.

DETAILED DESCRIPTION OF THE INVENTION

The inventors have studied to overcome the disadvantages of the conventional epoxy resin compositions and have found that a reaction product obtained by reacting a phenoxy resin or a high molecular weight epoxy resin with a monohydric alcohol glycidyl ether and a metal salt of carboxylic acid, imparts the characteristics as a hardening accelerator and a reactive diluent to a epoxy resin composition incorporating a hardener whereby the pot-life is prolonged and suitable viscosity for processing can be provided and excellent electrical and mechanical characteristics can be imparted by hardening the composition.

The epoxy resin compositions of the present invention comprise (A) a liquid epoxy compound having 2 or more epoxy groups in one molecule, (B) an acid anhydride type hardener and (C) a reaction product obtained by reacting a phenoxy resin or a high molecular weight epoxy resin with a monohydric alcohol glycidyl ether and a metal salt of carboxylic acid.

The ratios of the components are selected depending upon the processibility and the characteristics of the object hardened products.

The epoxy resin composition usually comprises 40 to 80 wt.parts of (A) the liquid epoxy compound, 60 to 90 wt.parts of (B) the acid anhydride hardener and 60 to 20 wt.parts of (C) the specific reaction products.

The hardened products of the epoxy resin composition of the present invention have excellent brittle deterioration resistance and flexibility.

It is considered that the epoxy resin and the phenoxy resin or the high molecular weight epoxy resin are not in a form of a simple mixture but are in the structure having ether bonds thereof whereby the brittle deterioration resistance and flexibility are increased.

The viscosity of the epoxy resin composition of the present invention can be easily adjusted to desirable viscosity for processing to impart excellent fabricatability and the hardened products of the epoxy resin composition have excellent mechanical and electrical characteristics. Accordingly, the epoxy resin compositions are suitable for various processings and fabrications such as impregnation as well as coating, casting and bonding processes.

It is possible to blend a filler such as glass fibers, organic fibers mica and inorganic powders or the other additive to the epoxy resin composition.

The liquid epoxy compounds having 2 or more epoxy groups used in the present invention can be various known epoxy compounds.

It is especially preferable to use bis-phenol type epoxy compounds having the formula

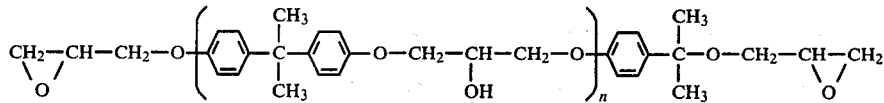

wherein n is less than about 15.

The commercially available bis-phenol type epoxy compounds include Epikote 828 and 826 (manufactured by Shell Chemical Co.) and DER-322, 330 and 331

(manufactured by Dow Chemical Co.) and Araldite GY-250 and 260 (manufactured by Ciba-Geigy) etc.

It is also possible to incorporate the alicyclic type epoxy compounds having the formula

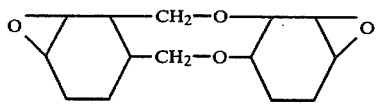

The commercially available alicyclic type epoxy compounds include Araldite CY-175 and 176 (Ciba-Geigy).

The alicyclic type epoxy compound is usually incorporated at a ratio of 10 to 50 wt.% preferably 20 to 40 wt.% to the bis-phenol type epoxy compound.

When the alicyclic type epoxy compound is incorporated, the electrical characteristics of the hardened products especially tracking resistance, are improved.

When the ratio of the alicyclic type epoxy compound is less than 10%, the effect is not significant whereas when it is more than 50%, the pot-life is disadvantageously short.

The acid anhydride type hardeners used in the present invention are preferably in a liquid form at room temperature.

Suitable acid anhydride type hardeners include methyl hexahydrophthalic acid anhydride, methyl tetrahydrophthalic acid anhydride and methyl nadic acid anhydride.

Suitable monohydric alcohol glycidyl ethers used for the preparation of the reaction product (C) include butylglycidyl ether phenylglycidyl ether, credylglycidyl ether p-butylphenolglycidyl ether, etc.

Suitable phenoxy resins include commercially available products having the formula

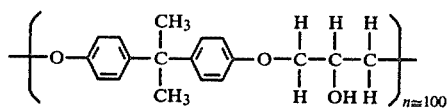

(molecular weight of about 30,000).

Suitable high molecular weight epoxy resins include commercially available products of Epikote-1004 and 1009 (Shell Chemical Co.) and mixtures thereof.

Either or both of the phenoxy resin and the high molecular weight epoxy resin can be incorporated at a ratio of 1 to 30 wt.parts per 100 wt.parts of the monohydric alcohol glycidyl ether.

When it is more than 30 wt.parts, the viscosity of the epoxy resin composition is too high and the fabricatability is deteriorated whereas when it is less than 1.0 wt.part, the improvements of the brittle deterioration resistance and flexibility are not significant in comparison with those of the hardened resins obtained by using the liquid epoxy compound without the reaction product.

Suitable metal salts of carboxylic acid include zinc, manganese, cobalt and nickel salts of $C_5$-$C_{17}$ carboxylic acids such as octylic acid, stearic acid, palmitic acid, naphthenic acid, capric acid, enanthic acid, caproic acid, myristic acid and lauric acid.

The reaction products (C) can be obtained by adding the monoglycidyl ether and the metal salt of carboxylic acid to the phenoxy resin or the high molecular weight epoxy resin and reacting them at about 110° C. for 2 to 3 hours in nitrogen atmosphere under stirring the mixture.

The optimum reaction temperature is in a range of 100° to 120° C. to impart excellent catalytic activity.

The ratio of the metal salt of carboxylic acid to a total of the monoglycidyl ether and the phenoxy resin or the high molecular weight epoxy resin is preferably in a range of 0.2 to 1.0%.

When the ratio is more than 1.0%, the pot-life of the composition is short whereas when it is less than 0.2%, the gelation is disadvantageously slow. The system can be stabilized by reacting the components in said condition.

The epoxy resin composition of the present invention can be obtained by incorporating the liquid epoxy compound, the acid anhydride hardener and the reaction product at optional ratios and preferably at ratios of 40 to 80 wt.parts:60 to 90 wt.parts:60 to 20 wt.parts from the viewpoints of the fabricatability and the characteristics of the hardened product.

It is considered that the epoxy resin composition of the present invention has excellent brittle deterioration resistance and flexibility because the liquid epoxy compound and the phenoxy resin or the high molecular weight epoxy resin are not in a form of a simple mixture but in a form of a structure having bonded units.

The following two reactions for forming the structure having bonded units are considered.

One is the reaction of the acid anhydride with hydroxy groups of the phenoxy resin or the high molecular weight epoxy resin as shown in the reaction formula (1).

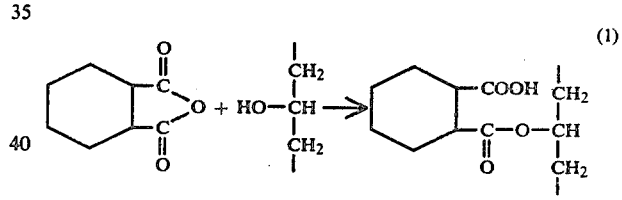

The other is the reaction of epoxy groups of the liquid epoxy compound with hydroxy groups of the phenoxy resin or the high molecular weight epoxy resin in the presence of the metal salt of carboxylic acid as shown in the reaction formula (2) wherein M represents a metal and R represents an alkyl group.

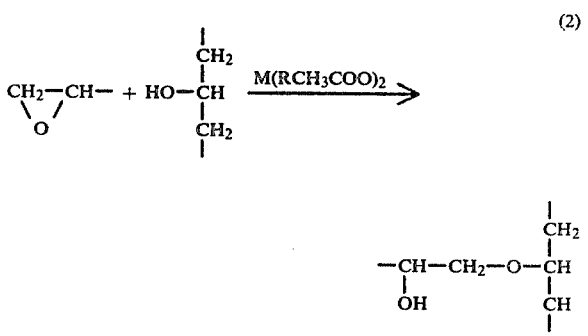

The ether bonds are formed by the reaction (2).

The ether bonds impart superior flexibility for the hardened product in comparison with the ester bonds formed in the hardening of the conventional epoxy resin with an acid anhydride.

In accordance with the present invention, the liquid epoxy compound is reacted with the phenoxy resin or the high molecular weight epoxy resin to form a structure having bonded units, and the ether bonds formed by the reaction impart excellent brittle deterioration resistance and flexibility of the hardened product of the epoxy resin composition.

The epoxy resin compositions of the present invention have excellent fabricatability, because the viscosity of the composition can be easily adjusted as desired and the hardened products of the epoxy resin composition have excellent mechanical and electrical characteristics whereby the epoxy resin compositions are suitable for various fabrications such as impregnating, coating, casting and bonding processes.

It is also possible to blend a filler such as glass fibers, organic fibers, mica and inorganic powders or the other additive to the epoxy resin composition.

Certain examples and reference are provided for purposes of illustration only and are not intended to be limiting in any manner.

REFERENCE 1

An epoxy resin composition was obtained by uniformly mixing 80 wt.parts of Epikote-828 (manufactured by Shell Chemical Co.), 85 wt.parts of a hardener of methyl hexahydrophthalic acid anhydride and 20 wt.parts of ethyleneglycol glycidyl ether.

(1) The epoxy resin composition was baked at 150° C. for about 50 hours to obtain a baked product. (In Reference 2 and Examples 1 to 5 each composition was baked at 150° C. for 16 hours.)

The impact strength and the mechanical characteristics (strength and elongation) and the electrical characteristics (dielectric loss tan 8%) of the baked product were measured and shown in Table 1.

(2) Variation of viscosity of the epoxy resin composition at 50° C. was measured by Brookfield viscometer manufactured by Tokyo Keiki K.K. The result was shown in Table 2.

(3) A coil for a rotary machine having insulated four layer wounds with Nomex sheet or tape (manufactured by DuPont) was impregnated with the epoxy resin composition in a closed tank equipped with a vacuum pump under a reduced pressure of about 5 mmHg.

The coil impregnating the reactive epoxy resin composition was baked at 150° C. in an oven to obtain a coated coil.

The dielectric loss-voltage characteristic of the coated coil was measured by connecting electrodes to the coated coil. The result is shown in Table 2.

REFERENCE 2

An epoxy resin composition was obtained by uniformly mixing 80 wt.parts of Epikote-828 (manufactured by Shell Chemical Co.), 80 wt.parts of a hardener of methyl hexahydrophthalic acid anhydride, 0.5 wt.part of a hardening accelerator of 2,4,6-tris(dimethylaminomethyl) phenol and 20 wt.parts of ethyleneglycol diglycidyl ether.

EXAMPLE 1

A mixture of 37 wt.parts of credylglycidyl ether, 3 wt.parts of phenoxy resin (manufactured by Union Carbide Chemical) and 0.3 wt. part of zinc octylate was heated at 110° C. for 2 to 3 hours in nitrogen atmosphere to react them and the mixture was cooled to the room temperature. Then, the reaction was admixed with and dissolved, in 80 wt.parts of methyl hexahydrophthalic acid anhydride and 60 wt.parts of Epikote-828 (manufactured by Shell Chemical Co.) were added to the reaction product to obtain an epoxy resin composition.

EXAMPLE 2

A mixture of 16 wt.parts of cresylglycidyl ether, 4 wt.parts of Epikote-1009 (manufactured by Shell Chemical Co.) and 0.3 wt.parts of zinc octylate was heated at 110° C. for 2 to 3 hours in a nitrogen atmosphere to react them and the mixture was cooled to the room temperature. Then, the reaction mixture was admixed with and dissolved in 85 wt.parts of methyl tetrahydrophthalic acid anhydride and 40 wt.parts of Epikote-828 (manufactured by Shell Chemical Co.) and 40 wt.parts of Araldite CY-175 (manufactured by Ciba-Geigy) to obtain an epoxy resin composition.

EXAMPLE 3

A mixture of 50 wt.parts of cresylglycidyl ether, 10 wt.parts of phenoxy resin (manufactured by Union Carbide Chemical) and 0.3 wt.part of manganese octylate was heated at 110° C. for 3 hours in nitrogen atmosphere to react them and the mixture was cooled to the room temperature. Then, the reaction was admixed with and dissolved in 85 wt.parts of methyl tetrahydrophthalic acid anhydride, 30 wt.parts of Epikote-828 (manufactured by Shell Chemical Co.) and 10 wt.parts of Araldite CY-180 (manufactured by Ciba-Geigy) to obtain an epoxy resin composition.

EXAMPLE 4

A mixture of 26 wt.parts of parabutylphenol glycidyl ethyl 4 wt.parts of phenoxy resin (manufactured by Union Carbide Chemical) and 0.2 wt.part of zinc stearate was heated at 120° C. for 3 hours in nitrogen atmosphere and the mixture was cooled to the room temperature. Then, the reaction mixture was admixed with and dissolved in 90 wt.parts of methylnadic acid anhydride and 70 wt.parts of Epikote-828 (manufactured by Shell Chemical Co.) to obtain an epoxy resin composition.

EXAMPLE 5

A mixture of 21 wt.parts of credylglycidyl ether, 21 wt.parts of phenylglycidyl ether and 8 wt.parts of phenoxy resin (manufactured by Union Carbide Chemical) and 0.3 wt.part of cobalt octylate was heated at 120° C. for 3 hours in nitrogen atmosphere and the mixture was cooled to the room temperature. Then, the reaction mixture was admixed with and dissolved in 80 wt.parts of methyl tetrahydrophthalic acid anhydride and 30 wt.parts of Epikote 828 (manufactured by Shell Chemical Co.) and 20 wt.parts of Araldite CY-175 (manufactured by Ciba-Geigy) to obtain an epoxy resin composition.

In accordance with the tests of Reference 1, the characteristics of the epoxy resin compositions of Reference 2 and Examples 1 to 5 were tested. The results are shown in Tables 1 to 4.

Table 1

| Epoxy resin composition | Characteristics of products obtained by hardening epoxy resin composition: | | | | |
|---|---|---|---|---|---|
| | Impact strength (kg-cm/cm$^2$) (JISK-6705) | Tensile tests ASTM D-638-52T | | Electrical characteristics | |
| | | Strength (kg/mm$^2$) | Elongation (%) | tan δA at 25° C. | tan δA at 150° C. |
| Reference 1 | 2.5 | 4.6 | 1.9 | 0.47 | 12.5 |
| 2 | 3.5 | 6.0 | 2.5 | 0.35 | 13.4 |
| Example 1 | 3.5 | 6.0 | 2.0 | 0.30 | 5.5 |
| 2 | 4.0 | 6.5 | 2.5 | 0.30 | 5.0 |
| 3 | 3.5 | 6.0 | 2.2 | 0.25 | 5.8 |
| 4 | 3.5 | 6.0 | 2.2 | 0.30 | 6.0 |
| 5 | 4.0 | 6.8 | 2.5 | 0.30 | 5.0 |

Table 2

| Epoxy resin composition | Variation of viscosity of epoxy resin composition at 50° C.: | | | | | |
|---|---|---|---|---|---|---|
| | Initiation | 1 day | 2 day | 5 day | 7 day | 9 day |
| Reference 1 | 38 | 42 | 54 | 70 | 110 | 210 |
| 2 | 110 | 370 | gelation | | | |
| Example 1 | 27 | 30 | 45 | 63 | 105 | 170 |
| 2 | 35 | 48 | 68 | 78 | 115 | 210 |
| 3 | 30 | 34 | 43 | 72 | 110 | 175 |
| 4 | 43 | 50 | 64 | 72 | 110 | 190 |
| 5 | 38 | 45 | 58 | 70 | 110 | 185 |

Table 3

| Epoxy resin composition | Electrical characteristics of insulated structure of model coil: |
|---|---|
| | Δtan δ (%) |
| Reference 1 | 4.13 |
| 2 | 3.50 |
| Example 1 | 1.57 |
| 2 | 0.92 |
| 3 | 1.46 |
| 4 | 1.23 |
| 5 | 0.90 |

Note:
Δtan = difference between tan δ at 3 KV/mm and tan δ at 1 KV/mm.

Table 4

| Epoxy resin composition | Gelation time: |
|---|---|
| | Gelation time at 150° C. |
| Reference 1 | 12 hr. |
| 2 | 26 min. |
| Example 1 | 20 min. |
| 2 | 14 min. |
| 3 | 18 min. |
| 4 | 22 min. |
| 5 | 14 min. |

In the characteristics of the products obtained by hardening the epoxy resin compositions of Examples, the impact strength and elongation were excellent and the brittle deterioration resistance and flexibility were remarkably improved in comparison with those of the conventional products of References 1 and 2.

In the characteristics of the product having insulating structure made of the epoxy resin compositions of Examples, the tan δ-voltage characteristic of the products of Examples is significantly superior to those of References.

Accordingly, it is understood that the products of Examples have dense insulating layers and have excellent adhesiveness.

Moreover, the epoxy resin compositions have suitable viscosity and long pot-life and excellent fabricatability and the economical advantages.

As described above, the epoxy resin compositions of the present invention have superior characteristics of the hardened products to provide excellent insulating structure and excellent electrical and mechanical characteristics in comparison with the conventional epoxy resin compositions.

What is claimed is:

1. An epoxy resin composition for flexible products, which comprises: (a) from 40 to 80 parts by weight of a liquid epoxy compound having at least two epoxy groups in one molecule; (b) from 60 to 90 parts by weight of an acid anhydride hardener; and (c) from 60 to 20 parts by weight of a reaction product obtained by reacting from 1 to 30 parts by weight of a phenoxy resin component selected from the group consisting of a phenoxy resin and a combination of said phenoxy resin with a high molecular weight epoxy resin with 100 parts by weight of a monohydric alcohol glycidyl ether and a metal salt of a carboxylic acid, the ratio of said metal salt to the total amount of monoglycidyl ether and phenoxy resin component ranging from 0.2 to 1.0%.

2. The epoxy resin composition according to claim 1 wherein the liquid epoxy resin is a bis-phenol type epoxy compound.

3. The epoxy resin composition according to claim 1 wherein the liquid epoxy compound is a mixture of a bis-phenol type epoxy compound and an alicyclic epoxy compound having the formula

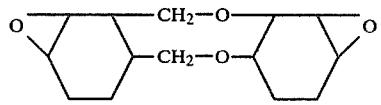

4. The epoxy resin composition according to claim 1, 3 or 4 wherein the acid anhydride hardener is in the form of a liquid at room temperature.

5. The epoxy resin composition according to claim 1, wherein said metal salt of a carboxylic acid is the zinc, manganese, cobalt or nickel salt of a $C_5$–$C_{17}$ carboxylic acid.

6. The epoxy resin composition according to claim 1, wherein said reaction product is formed by reacting said phenoxy resin component with said monohydric alcohol glycidyl ether and said metal salt at a temperature of 100° to 120° C. for 2 to 3 hours.

7. The epoxy resin composition according to claim 5, wherein said carboxylic acid is octylic acid, stearic acid, palmitic acid, naphthenic acid, capric acid, enanthic acid, caproic acid, myristic acid or lauric acid.

8. The epoxy resin composition of claim 1, wherein said acid anhydride hardener is methyl hexahydrophthalic acid anhydride, methyl tetrahydrophthalic acid anhydride or methyl nadic acid anhydride.

9. The epoxy resin composition according to claim 1, wherein said monohydric alcohol glycidyl ether is butylglycidyl ether, phenylglycidyl ether, credylglycidyl ether or p-butylphenolglycidyl ether.

10. The epoxy resin composition according to claim 3, wherein 10 to 50 wt.% of said liquid epoxy compound is said alicyclic epoxy compound.

* * * * *